United States Patent [19]

Mostaert et al.

[11] Patent Number: 5,610,001
[45] Date of Patent: Mar. 11, 1997

[54] PRIMED RESIN FILM

[75] Inventors: Erik Mostaert, Boechout; August Mariën, Westerlo; Marc Van Damme, Heverlee, all of Belgium

[73] Assignee: Agfa-Gevaert N. V., Mortsel, Belgium

[21] Appl. No.: 266,157

[22] Filed: Jun. 27, 1994

Related U.S. Application Data

[63] Continuation of Ser. No. 19,677, Feb. 19, 1993, abandoned.

[30] Foreign Application Priority Data

Feb. 29, 1992 [EP] European Pat. Off. ............. 9220593

[51] Int. Cl.$^6$ ..................................................... G03C 1/76
[52] U.S. Cl. ........................... 430/533; 430/531; 430/523
[58] Field of Search ................................. 430/531, 533, 430/523

[56] References Cited

U.S. PATENT DOCUMENTS

| | | | |
|---|---|---|---|
| 4,265,946 | 5/1981 | Yabe et al. | 430/533 |
| 4,478,907 | 10/1984 | Van Gossum | 430/533 |
| 5,057,403 | 10/1991 | Kume et al. | 430/533 |
| 5,194,347 | 3/1993 | Vermeulen et al. | 430/533 |
| 5,204,219 | 4/1993 | Ooij et al. | 430/533 |

*Primary Examiner*—Geraldine Letscher
*Attorney, Agent, or Firm*—William J. Daniel

[57] ABSTRACT

A web or sheet material which comprises a hydrophobic resin support having coated directly thereon a primer layer essentially consisting of a mixture of ingredients (A), (B) and (C) applied as a dispersion from aqueous medium, wherein:

(A) is a copolyester containing recurring ester groups derived from ethylene glycol and an acid mixture containing terephthalic acid, isophthalic acid and 5-sulphoisophthalic acid whose sulpho group is in salt form, said acid mixture consisting essentially of from 20 to 60 mole % of isophthalic acid, 6 to 10 mole % of said sulphoisophthalic acid, 0.05 to 1 mole % of cross-linking agent being an aromatic polycarboxylic acid compound having at least three carboxylic acid groups or corresponding acid generating anhydride or ester groups, the remainder in said acid mixture being terephthalic acid, (B) is a copolymer formed from 45 to 70% by weight of a lower (C1–C4) alkyl methacrylate, 25 to 50% by weight of butadiene and from 2 to 5% by weight of an ethylenically unsaturated carboxylic acid, and (C) is colloidal silica.

5 Claims, No Drawings

PRIMED RESIN FILM

This application is a continuation of application Ser. No. 08/019,677 filed Feb. 19, 1993, now abandoned.

1. Field of the Invention

The present invention relates to a web or sheet material which comprises a hydrophobic resin support having in direct contact therewith a layer imparting adherence to said material and a more hydrophilic layer coated thereon.

The invention is particularly concerned with a recording material wherein a hydrophilic colloid-containing layer, e.g. a light-sensitive gelatin-silver halide emulsion layer, is anchored to a hydrophobic resin support.

2. Background of the Invention

The surfaces of resin film base materials used in photography have a non-polar character. That non-polar or hydrophobic character will not allow to form a strong bond with hydrophilic or polar layers.

For example, a photographic gelatin-containing silver halide emulsion representing an aqueous suspension will by its hydrophilic character not form an adhering coating on an untreated non-polar hydrophobic base. Therefore a pretreatment of said base known as subbing is necessary. This consists basically of coating at least one intermediate layer on the film base for anchoring thereto the hydrophilic coating. Some subbing treatments involve an assemblage of succesive layers becoming progressively more hydrophilic.

Preferred resin film supports in photographic recording materials are made of a linear polyester film stretched in biaxial direction and subbed before coating with the hydrophilic colloid-containing recording layer composition. A survey of supports useful in the manufacture of photographic silver halide emulsion layer materials is given in Research Disclosure December 1989, item Nr. 308 in paragraph XVII, part F.

An effective subbing can be obtained by an assemblage of already two layers. The first subbing layer, called primer layer, is normally made of a chlorine-containing copolymer as described e.g. in U.S. Pat. No. 3,649,336. In a preferred mode a vinylidene chloride copolymer in latex-form having some hydrophilic functionality through the presence of a copolymerized unsaturated carboxylic acid, is applied to an already longitudinally stretched polyethylene terephthalate film. The second subbing layer usually containing gelatin in admixture with a hydrophobic latex-copolymer provides a good anchorage to both the primer layer and an adjacent hydrophilic colloid-containing layer, e.g. a gelatin-containing photographic silver halide emulsion layer or backing layer e.g. serving as anti-halation or anti-curl layer.

An important problem associated with the use of resin film materials comprising a chlorine-containing primer layer arises when waste material goes to an incinerator wherein noxious and corrosive chlorine-containing vapours will be formed with possible production of highly toxic dioxines.

This problem can be avoided by applying subbing layers that are halogen-free.

It has been proposed as described e.g. in U.S. Pat. Nos. 3,563,942, 4,252,885, 4,340,519, 4,394,442 and 4,478,907, to use chlorine-free primer layer materials, in particular copolyesters modified with a sulfonated aromatic compound.

In order to become water-dispersible these copolyesters contain a certain amount of sulphonic acid groups in salt form (ref. GB-P 1,589,926) and as described in U.S. Pat. No. 4,478,907 and EP 78 559 for raising their glass transition temperature (Tg) contain an amount of particular co-condensated cross-linking agent(s).

Although these chlorine-free copolyesters form a satisfactory subbing layer there adherence in wet state should still be improved, the content of the sulphonic acid salt groups being responsible for some swelling and providing less good bonding in wet state. Moreover, it would be desirable to dispose of a still more easily stretchable primer layer than one made solely of these modified copolyesters. Such is of importance in the production of subbed polyester film the dimensional stability and mechanical strength of which is improved by biaxial stretching and heat-setting.

It is common practice to apply the primer layer between the longitudinal and the tranversal stretching stage.

In said transversal stretching stage the primer layer has to retain a good anchorage and must have an elastic modulus adapted to easily follow the film enlargement in the stretching. The elastic modulus is the ratio of stress (force per unit area) to strain, the latter being a pure number representing the percentage of elongation (ref. Sears & Zemansky "University Physics", 4th ed.—Addison-Wesley Publishing Company—Reading, Mass., U.S.A., p. 154–155).

After the biaxial stretching the film is conducted through a heat-setting zone wherein the primed polyethylene terephthalate film is heated until a temperature between 180° and 220° C. is reached, the film being kept under tension in both directions.

OBJECTS AND SUMMARY OF THE INVENTION

It is an object of the present invention to provide a sheet material which comprises a hydrophobic resin Support and an improved water-resistant primer layer capable of anchoring thereto a hydrophilic colloid-containing layer that has good subbing properties with regard to a gelatin-containing layer such as a gelatin-silver halide emulsion layer.

It is a further object of the present invention to provide such sheet material wherein said primer layer is applied from an aqueous coating composition, without use or without substantial use of organic solvents so that the coating process isecologically clean and of low cost by the absence of solvent recovery.

Other objects and advantages of the present invention will be apparent to persons skilled in the art by the following description.

According to the present invention a web or sheet material is provided which comprises a hydrophobic resin support having coated directly thereon a primer layer essentially consisting of a mixture of ingredients (A), (B) and (C) applied as a dispersion from aqueous medium, wherein:

(A) is a copolyester containing recurring ester groups derived from ethylene glycol and an acid mixture containing terephthalic acid, isophthalic acid and 5-sulphoisophthalic acid whose sulpho group is in salt form, said acid mixture consisting essentially of from 20 to 60 mole % of isophthalic acid, 6 to 10 mole % of said sulphoisophthalic acid, 0.05 to 1 mole % of crosslinking agent being an aromatic polycarboxylic acid compound having at least three carboxylic acid groups or corresponding acid generating anhydride or ester groups, the remainder in said acid mixture being terephthalic acid, (B) is a copolymer formed from 45 to 70% by weight of a lower (C1–C4) alkyl methacrylate, 25 to 50% by weight of butadiene and from 2 to 5% by weight of an ethylenically unsaturated carboxylic acid, and (C) is colloidal silica.

The ratio by weight of (A) to (B) is preferably in the range of 50/50 to 90/10, and more preferably in the range of 55/45 to 70/30.

The amount of (C) may vary widely, but is preferably in the range of 10 to 40% by weight with respect to (A)+(B).

DETAILED DESCRIPTION OF THE INVENTION

In a preferred embodiment, said copolyester (A) has a glass transition temperature of at least 50° C. and an intrinsic viscosity of from 0.15 to 0.45 dl/g when measured at 25° C. in a mixture of phenol/o-dich orobenzene (60/40 by volume).

The determination of the Tg value proceeds as described in European Patent Specification 0 078 559 corresponding to U.S. Pat. No. 4,478,907.

The preparation of copolyesters defined above under (A) can be carried out as described in U.S. Pat. No. 4,478,907 and corresponding EP 0 078 559.

Suitable cross-linking agents for obtaining said copolyesters with a Tg above 50° C. are lower alkyl esters of a polycarboxylic acid corresponding to the following general formula:

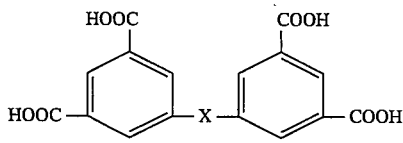

wherein X represents a chemical bond or a bivalent atom or bivalent group of atoms e.g. oxygen, alkylene such as methylene, carbonyl, sulphonyl, —$NHSO_2$—, —NH-CONH— or a —NH—Q—Y—Q—NH—group wherein Q represents carbonyl or sulphonyl and Y represents a bivalent organic group e.g. a bivalent aliphatic or aromatic group.

According to a convenient method the X group is introduced between aromatic nuclei already containing the carboxylic acid or ester groups by a condensation reaction starting from 5-amino-isophthalic acid or its corresponding lower alkyl ester e.g. dimethyl ester and the proper acid chloride to yield the bivalent X bond.

For illustration purposes the preparation of a preferred polycarboxylic acid methyl ester cross-linking agent is given and hereinafter referred to as compound CA.

Preparation of compound CA

In a 1-liter round-bottomed flask with a stirrer, a reflux-condenser, a thermometer and dropping funnel were introduced 41.8 g (0.2 mole) of 5-amino-isophthalic acid dimethyl ester, 18.48 g (0.22 mole) of sodium hydrogen carbonate and 400 ml of anhydrous acetone. The mixture is heated under reflux for a short time and then cooled down again to room temperature. At that temperature 15.5 g (0.1 mole) of succinylchloride dissolved in 25 ml of anhydrous acetone were added dropwise whilst stirring. The reaction product precipitated during that operation. The whole mixture was then kept stirring for 1 h at room temperature and for 1 h at reflux temperature. Thereupon the reaction mixture was cooled in ice and the precipitated reaction product separated by suction filtering and dried in vacuum.

The crude product can be purified by washing with water and recrystallization from dimethyl formamide.

In the polycondensation reaction for forming the copolyesters (A) the above polyfunctional carboxylic acids increase the Tg-value of the copolyester. Properly chosen proportions of sulpho groups, the degree of polycondensation and cross-linking provide the required dispersibility in water of the copolyester.

Although ethylene glycol is used preferably as the sole diol in the preparation of aqueous copolyester dispersions for use according to the present invention minor amounts (e.g. up to 5 mole %) of other diols may be used with the proviso that the required Tg value, intrinsic viscosity and dispersibility are still obtained. Diols in their broad definition for use according to the invention are dihydric alcohols or functional derivatives thereof such as esters, which are capable of condensing with polyacids or their functional derivatives to form condensation polymers. Exemplary diols other than ethylene glycol and of which said minor amounts may be used are 1,3-propanediol, 1,4-butanediol, 2-methyl-1,5-pentanediol, neopentylglycol, 1,4-cyclohexanedimethanol, norcamphanediols, 1,4-benzenedimethanol and corresponding alkyl esters thereof.

A preferred copolyester for use according to the present invention is a polycondensation product containing recurring ester groups derived from ethylene glycol and an acid mixture consisting of 53 mole % of terephthalic acid, 40 mole % of isophthalic acid, 7 mole % of 5-sulphoisophthalic acid and 0.1 mole % of polycarboxylic acid corresponding with the polycarboxylic acid methyl ester represented by compound CA prepared as described above.

For illustration purposes the preparation of said preferred copolyester referred to in the Example as copolyester P is given.

| Preparation of copolyester P | |
|---|---|
| A reaction mixture of: | |
| 1027.2 g of dimethyl terephthalate | (5.295 moles) |
| 775 g of dimethyl isophthalate | (3.995 moles) |
| 207.2 g of 5-sulphoisophthalic acid dimethyl ester sodium salt | (0.7 mole) |
| polycarboxylic acid methyl ester compound CA | (0.01 mole) |
| 1240 g of ethylene glycol | (20 moles) |
| 220 mg of zinc acetate dihydrate, and | |
| 292 mg of antimony(III)oxide | | was heated to 160° C. whilst stirring in a nitrogen atmosphere.

At that temperature re-esterification started and methanol was distilled. Gradually the temperature was raised to 250° C. over a period of 3 to 4 h, until no methanol distilled anymore. Thereupon the temperature was further raised to 255° C. and the reaction mixture subjected to a reduced pressure of 0.1–0.2 mm Hg. Under these conditions the polycondensation took place within a period of about 60 to 100 min. After cooling the solidified copolyester was milled and obtained in powder form. Depending on the time of polycondensation the intrinsic viscosity of the copolyester was from 0.20 to 0.30 dl/g measured at a temperature of 25° C. in a mixture of phenol and o-dichlorobenzene(60/40 by volume). The Tg value of said copolyester is in the range of 67° to 72° C.

The preparation of an aqueous copolyester (A) dispersion is carried out by vigorously stirring the copolyester powder in hot (90°–98° C.) water. Operating that way a copolyester dispersion with average particle size smaller than 50 nm and up to 30% by weight can be obtained easily and is used as such in combination with the other ingredients (B) and (C).

The copolymer (B) formed from 45 to 70% by weight of methyl methacrylate, 25 to 50% by weight of butadiene and from 2 to 5% by weight of an ethylenically unsaturated carboxylic acid is prepared as a latex by classical emulsion polymerization conducted in aqueous medium in the presence of an initiator compound. A common initiator compound is a water-soluble persulphate or a redox system based e.g. on hydrogen peroxide and a ferrous salt. A survey of initiators used in emulsion polymerization is given in High Polymers 9, Emulsion Polymerization, Interscience Publishers, Inc., New York, 1955.

In the emulsion preparation producing said copolymer (B) preferably an aqueous latex with solids content in the range of 20 to 50% by weight is formed, which is applied as such in combination with the other ingredients (A) and (B) for forming the coating composition of the primer layer.

A preferred copolymer (B) for use according to the present invention is a copolymer containing 49% by weight of methyl methacrylate units, 49% by weight of butadiene units and 2% by weight of itaconic acid units.

Ingredient (C) the colloidal silica has preferably an average particle size not larger than 100 nm, preferably not larger than 50 nm.

Colloidal silica having an average grain size between 5 and 100 nm is available in aqueous colloidal dispersions marketed under the commercial names LUDOX (trade name of E. I. du Pont de Nemours, Wilmington, Del. U.S.A., and SYTON (trade name of Monsanto Chemical Corporation, Boston Mass. U.S.A.) and KIESELSOL (trade name of Bayer AG, Leverkusen, Germany). Particularly suited is KIESELSOL 100 F wherein the colloidal silica has a particle size in the range of 25 to 30 nm.

The above defined aqueous dispersion containing the ingredients (A), (B) and (C) may be applied by any coating technique to the resin film base material, e.g. is applied thereto by roller coating, high speed curtain coating or dip-coating for double-side coating. Spreading agents known in the art such as anionic wetting agents counteract repellence of the coating composition and allow high coating speed, e.g. up to 75 m/s.

Before applying the primer layer composition the resin sheet or web material may be re-treated to improve bonding, e.g. is subjected to a corona-discharge and/or to attack by solvent(s) or adhesion-improving agents, e.g. resorcinol, as described e.g. in published European Patent Applications (EP-A) 0 429 179 and 0 078 559.

Although the present primer coating composition is particularly suited for use in combination with polyethylene terephthalate film supports, other resin supports known in the art may be coated thereby, e.g. polycarbonate, polystyrene, polymethacrylic acid ester and corona or flame treated polypropylene supports.

The coating of the primer layer proceeds advantageously between longitudinal and transversal stretching of a polyethylene terephthalate film web, wherein the stretching in transverse direction may be e.g. at a draw of 2.5:1 to 4.0:1.

The primer layer may have after drying and co-stretching with the resin support a thickness in the range of 0.1 to 0.5 μm.

The primed film may be used for producing directly thereon a metallic layer, e.g. applied by vapour deposition or sputtering. Suitable metals that can be applied by vapour deposition are described e.g. in published European Patent Application (EP-A) 0 429 179, aluminium being preferred for reasons both of economy and ease of bonding. The primed film may be used likewise in the production of heat-mode recording materials wherein a heat-mode recording layer, e.g. bismuth layer is applied by vapour deposition under vacuum conditions and protected by lamination as described in published EP-A 0 384 041.

In the preparation of drafting film, useful to be written on with pencil, the primer layer is overcoated with a lacquer layer as described e.g. in the already mentioned published EP-A 0 429 179.

In the preparation of photographic silver halide emulsion layer materials the primer layer is coated preferably with a second more hydrophilic subbing layer containing a certain amount of hydrophilic colloid such as gelatin.

A suitable second subbing layer has a composition as described for layer (B) in U.S. Pat. No. 3,649,336 and corresponding GB-P 1,234,755. The second subbing layer comprises e.g. in a weight ratio of 1:3 to 1:0.5 a mixture of gelatin and colloidal silica. Said coating composition may contain wetting agents improving the spreading of the coating and plasticizers, e.g. polyoxyalkylene compounds and polyols and the gelatin plasticizers described in published EP-A 0 078 559 improving the flexibility of the coating.

Further the second subbing layer may contain matting agents, anti-static substances, biocides, light-absorbing or reflecting pigments, e.g. carbon black and/or titanium dioxide and/or bleachable dyes.

The thickness of the dry second subbing layer may vary between 0.10 and 5 μm, and is normally about 1 μm.

Apart from light-sensitive hydrophilic gelatin-silver halide emulsion layers any other gelatin-containing layer that has not to be photo-sensitive may be applied to the dual-subbing layer assemblage according to the present invention. For example, said subbing assemblage may be used for anchoring a sheet or web support having a hydrophic resin surface to a mainly gelatin-containing antihalation layer, anti-curl layer, gelatinous image-receiving layer containing physical development nuclei for use in diffusion transfer reversal photography (DTR-photography) or gelatinous image-receiving layer containing a mordant for image-wise transferred dyes.

The principles and embodiments of silver image formation by DTR-photography are described e.g. by André Rott and Edith Weyde in the book "Photographic Silver Halide Diffusion Processes"—The Focal Press London and New York (1972), and the principles and embodiments of the production of colour images by dye diffusion transfer are described e.g. by C. Van de Sande in Angew. Chem. Int. Ed. Engl. 22, (1983) p. 191–209.

The second subbing layer may be omitted when the layer to be adhered mainly contains a less hydrophilic colloidal binder material than gelatin, e.g. polyvinyl alcohol derived from partially hydrolyzed polyvinyl acetate, and alkali-soluble acrylic type polymers and copolymers containing free carboxyl groups, which polymers may be applied in formulations for the production of photo-resists as described e.g. in European Patent Specification (EP) 0 036 221.

The present invention is illustrated by the following examples without, however, limiting it thereto. The ratios and percentages are by weight unless otherwise indicated.

EXAMPLE (including comparative materials)

A melt-extruded polyethylene terephthalate support being longitudinally stretched and having a thickness of 330 μm was coated at both sides at a coverage of 0.75 g of solids per m² per liter with the following coating mixture for forming a primer layer I according to the present invention:

| | |
|---|---|
| 25% aqueous dispersion of the copolyester P | 100 ml |
| 40% aqueous dispersion of copoly(methyl methacrylate/butadiene/itaconic acid)(49/49/2) | 37.5 ml |
| KIESELSOL 100 F (trade name of Bayer AG. Germany) for a 30% colloidal dispersion of silica in water (SiO₂ particle size in the range of 25–30 nm) | 27.3 ml |
| water up to | 500 ml |

The pH of the subbing coating composition was adjusted to 8 with ammonia.

After drying at 70° C. the primed film was transversally stretched at about 150° C. with a draw ratio of 3.3:1 and heat-set under tension at a temperature of 180° C. for 20 seconds.

On the cooled primed film to both sides a second subbing layer was applied at a solids coverage of 1 g/m² from the following coating composition:

| | |
|---|---|
| gelatin | 7 g |
| KIESELSOL 300 F (tradename for 30% aqueous dispersion of colloidal silica - average particle size of about 8 nm) | 44 ml |
| 1,2,6-hexanetriol | 1.8 g |
| anionic wetting agent | 0.6 g |
| as matting agent methyl methacrylate particles having an average particle size of 3μ (20% aqueous dispersion) | 0.15 ml |
| water up to | 1000 ml |

After drying the subbed film was cooled and wound up on a core.

The film had finally a thickness of about 100 μm.

The thus double-side subbed polyester film was provided at one side with a gelatino-antihalation layer and at the other side with a gelatin-silver halide emulsion layer as used in the manufacture of a photographic material for application in the graphic arts.

The adhesion was checked in dry state and in wet state.

In the dry adhesion test the coated layer assemblage was cut reaching the film base by means of a razor blade cutting cross-wise under an angle of 45°. An adhesive tape (TESA-PACK 4122-tradename of BEIERSDORF AG, Hamburg, Germany) was pressed on the cross-cut areas and torn off abruptly under an angle of 45°.

The quality of the dry adhesion was evaluated by giving the peeling off a rating from 0 to 4, wherein 0 stands for non-peeling and 4 for complete removal of the scratched emulsion layer areas.

In the wet adhesion test the coated layer assemblage was dipped for 4 seconds into a common alkaline developing liquid (pH=10), whereupon the layer assemblage was scratched cross-wise with a pen tip reaching the film base.

The adhesion in wet state was checked by rubbing the wetted layer assemblage with finger tip for 10 seconds.

The quality of the wet adhesion was evaluated by giving the result of the rubbing a rating from 0 to 4, wherein 0 stands for non-removal and 4 for complete removal by said rubbing.

For comparison purposes the above primer layer composition I was modified to form compositions II and III outside the scope of the present invention and the silver halide emulsion layer materials prepared therewith were subjected to the same dry and wet adhesion tests.

The following Table 1 contains the definition of the different primer layers by the ratio of the materials (A), (B) and (C) as formulated in the claim of the present invention and the adhesion rating obtained therewith in dry as well as in wet state. In said Table 1 (A) stands for the copolyester defined above in primer composition I, (B) stands for the butadiene copolymer defined above in primer composition I, and (C) stands for the colloidal silica defined above in primer composition I.

TABLE 1

| Primer composition | (A)/(B)/(C) | Adhesion rating | |
|---|---|---|---|
| | | dry | wet |
| I | 40/40/20 | 0 | 0 |
| II | 80/0/20 | 0 | 4 |
| III | 70/10/20 | 0 | 1 |
| IV | 85/15/0 | 1 | 4 |
| V | 100/0/0 | 1/2 | 4 |

We claim:

1. A web or sheet material which comprises a hydrophobic resin support having coated thereon:
   (I) A first primer layer coated directly on said resin support and consisting essentially of a mixture of ingredients (A), (B) and (C) applied as a dispersion from an aqueous medium, wherein:
      (A) is a copolyester containing recurrent ester groups derived from ethylene glycol and an acid mixture containing terephthalic acid, isophthalic acid and 5-sulphoisophthalic acid whose sulpho group is in salt form, said acid mixture consisting essentially of from 20 to 60 mole % of isophthalic acid, 6 to 10 mole % of said sulphoisophthalic acid, 0.05 to 1 mole % of cross-linking agent being an aromatic polycarboxylic acid compound having at least three carboxylic acid groups or corresponding acid generating anhydride or ester groups, the remainder in said acid mixture being terephthalic acid,
      (B) is a copolymer formed from 40 to 70% by weight of a lower (C1–C4) alkyl methacrylate, 25 to 50% by weight of butadiene and from 2 to 5% by weight of an ethylenically unsaturated carboxylic acid,
      (C) is colloidal silica, and the ratio by weight of (A) to (B) is in the range of 40/40 to 70/10, the amount of (C) being in the range of 10 to 40% by weight with respect to (A)+(B);
   (II) A second primer layer coated on said first primer layer and comprising a gelatin binder containing colloidal silica; and
   (III) A photosensitive layer present on said second primer layer and containing gelatin as a binder for a photosensitive material.

2. Web or sheet material according to claim 1, wherein said copolyester (A) has a glass transition temperature of at least 50° C. and an intrinsic viscosity of from 0.15 to 0.45 dl/g when measured at 25° C. in a mixture of phenol/o-dichlorobenzene (60/40 by volume).

3. Web or sheet material according to claim 1, wherein said colloidal silica has an average particle size not larger than 100 nm.

4. Web or sheet material according to claim 1, wherein said photo-sensitive layer is a gelatin-silver halide emulsion layer.

5. Web or sheet material according to claim 1, wherein the amount of (C) is 20% by wt with respect to of (A)+(B).

* * * * *